(12) United States Patent
Gilman et al.

(10) Patent No.: US 10,309,853 B2
(45) Date of Patent: Jun. 4, 2019

(54) CLIMATE CONTROL PRESSURE PLUG WITH SENSOR

(71) Applicant: Trensor, LLC, Irvine, CA (US)

(72) Inventors: Scott C. Gilman, Irvine, CA (US); Steven D. Gilman, Irvine, CA (US); Jingxun Zhou, Wuxi (CN); James Resutek, Romeo, MI (US)

(73) Assignee: Trensor, LLC, Lake Forest, CA (US)

( * ) Notice: Subject to any disclaimer, the term of this patent is extended or adjusted under 35 U.S.C. 154(b) by 0 days.

(21) Appl. No.: 15/991,145

(22) Filed: May 29, 2018

(65) Prior Publication Data

US 2018/0275003 A1    Sep. 27, 2018

Related U.S. Application Data

(63) Continuation of application No. 14/884,359, filed on Oct. 15, 2015, now Pat. No. 9,983,083.

(60) Provisional application No. 62/064,650, filed on Oct. 16, 2014.

(51) Int. Cl.
| | |
|---|---|
| *G01L 19/14* | (2006.01) |
| *G01L 19/00* | (2006.01) |
| *B23P 15/26* | (2006.01) |
| *G01K 13/00* | (2006.01) |

(52) U.S. Cl.
CPC .......... *G01L 19/0092* (2013.01); *B23P 15/26* (2013.01); *G01K 13/00* (2013.01); *G01L 19/14* (2013.01); *G01K 2201/02* (2013.01)

(58) Field of Classification Search
CPC .............. F25B 39/04; F25B 2339/0441; F25B 2339/0443; F25B 2400/162; G01K 1/08; G01K 1/14; G01K 1/146; G01K 13/00; G01K 2201/02; G01L 19/14; G01L 19/0092; B23P 15/26
USPC ......... 73/714, 431, 866.5; 62/474, 473, 531, 62/86, 217
See application file for complete search history.

(56) References Cited

U.S. PATENT DOCUMENTS

| | | | | |
|---|---|---|---|---|
| 4,453,401 A * | 6/1984 | Sidey | .................... | G01L 9/0001 73/73 |
| 9,341,398 B2 * | 5/2016 | Liu | ........................ | F25B 41/062 |
| 2001/0025511 A1 * | 10/2001 | Bernini | ................ | B01D 5/0072 62/531 |
| 2005/0000295 A1 * | 1/2005 | Lohmeier | ........... | G01L 19/0038 73/727 |
| 2005/0139011 A1 * | 6/2005 | Yamakawa | ......... | G01L 19/0645 73/753 |
| 2010/0033277 A1 * | 2/2010 | Davis | .................. | H02J 13/0075 335/205 |

* cited by examiner

*Primary Examiner* — Lisa M Caputo
*Assistant Examiner* — Suman K Nath
(74) *Attorney, Agent, or Firm* — K. David Crockett, Esq.; Niky Economy Syrengelas, Esq.; Crockett & Crockett, PC

(57) ABSTRACT

A sensor-plug for insertion into a drier bottle of an automotive condenser. The sensor-plug is a unitary piece and positioned within the drier bottle to eliminate the use of a separate sensor on the opposite side of the condenser.

13 Claims, 7 Drawing Sheets

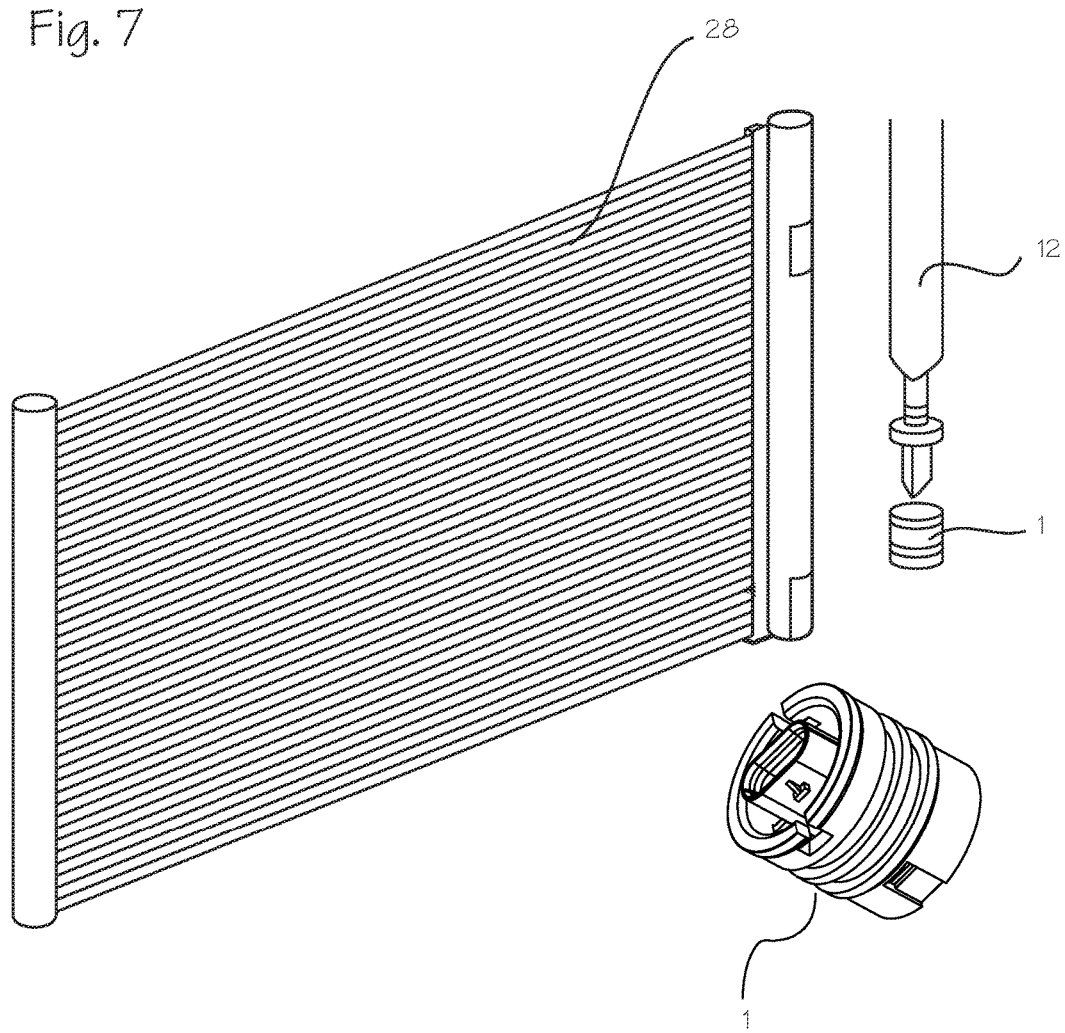

CLIMATE CONTROL PRESSURE PLUG WITH SENSOR

This application is a continuation of U.S. application Ser. No. 14/884,359, filed Oct. 15, 2015, now U.S. Pat. No. 9,983,083, which claims priority to U.S. Provisional Application 62/064,650, filed Oct. 16, 2014.

FIELD OF THE INVENTIONS

The inventions described below relate the field of air conditioning systems for use in automotive and commercial vehicles and more particularly to a climate control pressure plug containing a sensor within the plug.

BACKGROUND OF THE INVENTIONS

In a typical automotive air conditioning system, refrigerant is compressed by a compressor unit driven by the automotive engine. The compressed refrigerant, at high temperature and pressure, enters a condenser where heat is removed from the compressed refrigerant. The refrigerant then travels through a receiver/drier to a thermal expansion valve. The thermal expansion valve throttles the refrigerant as it flows through a valve orifice, which causes the refrigerant to change phase from liquid to a saturated liquid/vapor mixture as it enters the evaporator. In the evaporator, heat is drawn from the environment to replace the latent heat of vaporization of the refrigerant, thus cooling the environmental air. The low-pressure refrigerant flow from the evaporator returns to the suction side of the compressor to begin a new cycle.

The condenser is a device used to change the high-pressure refrigerant vapor to a liquid. The condenser is always mounted directly in front of the vehicle radiator. The vapor is condensed to a liquid because of the high pressure driving it in, which generates a great deal of heat. The heat is then removed from the condenser by air flowing through the condenser on the outside. The condenser contains a drier bottle located on the high-pressure section of the condenser that acts as the temporary storage container for the oil and refrigerant when neither is needed for system operation. The drier bottle typically contains a plug on the bottom seal of the drier bottle. Typical condensers also include pressure sensors contained on the condenser on the opposite side of the drier bottle.

Typically, the drier bottle plugs are made of plastic or aluminum and inserted into the bottom of the drier bottle. The plug seal is completed with the assistance of O-rings. The plastic thread-in plugs thread into the aluminum threads contained on the drier bottle. The threading of the plastic threads from the plugs, into the aluminum threads on the drier bottle, results in problems associated with cross threading. Further, debris caused by the plastic threads within the tight aluminum threads due to over torquing or under torquing on the assembly line results in debris being trapped inside the condenser and ultimately inside the entire air conditioning system, as they are closed loop systems. The condenser sensor is a separate additional part contained on the opposite side of the condenser as the drier bottle. Integration of the sensor into the condenser's drier bottle plug reduces the overall weight of the condenser, reduces the amount of components required for use with the condenser and reduces the costs associated with the machining of block fittings and the required port fitting with Schrader valve needed to secure the sensor to the condenser or elsewhere in the system such as the directly on an AC line or on a non-condenser mounted receiver drier.

SUMMARY

The devices and methods described below provide for a condenser plug which includes a sensor. The sensor is included within the condenser plug to form a single unitary piece. The device can be referred to as sensor-plug. The sensor-plug includes a housing adapted to be inserted into a condenser drier bottle. The sensor-plug can be inserted and secured into the drier plug via a retained or threaded sensor-plug housing. The sensor contained within the housing can be a pressure, temperature or combination pressure/temperature sensor. When the sensor-plug is inserted within the drier bottle, it creates a seal within the drier bottle to prevent fluid flow through the drier bottle.

When positioned into the condenser, a desiccant assembly or drier cartridge is inserted into the condenser drier. The sensor-plug is inserted within the drier bottle, behind the drier cartridge. A threaded sensor-plug is held in position by a threaded connection. The sensor-plug is tightened to a predetermined torque specification. A seal is formed between the sensor-plug and the drier bottle via at least one O-ring on the sensor-plug. Alternatively, a retained or non-threaded sensor-plug bottoms out on a machined lip in the sidewall of the drier bottle. A seal is formed between the sensor-plug and the drier bottle via at least one O-ring on the plug. Once in place, the sensor-plug is held in position with a large snap ring that fits into a groove in the sidewall of the drier bottle above the sensor-plug.

BRIEF DESCRIPTION OF THE DRAWINGS

FIG. 7 illustrates the sensor-plug in use within a condenser.

DETAILED DESCRIPTION OF THE INVENTIONS

Figure 1A:
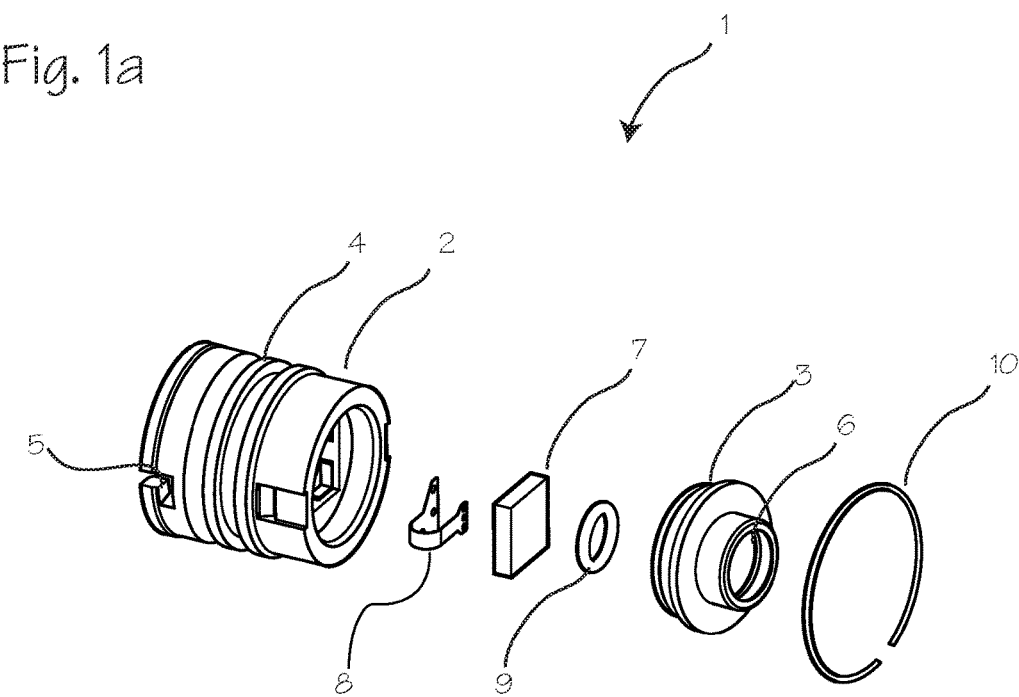
FIGS. 1a and 1b illustrate exploded and assembled views of a sensor-plug.
Figure 1B:
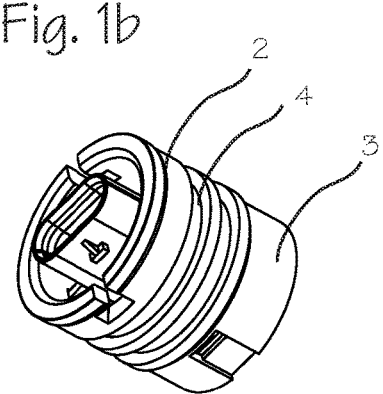

FIGS. 1a and 1b illustrate exploded and assembled views of a sensor-plug. 1. The sensor-plug includes a plug housing having a first housing portion 2 with first and second ends and a second housing portion 3 with first and second ends. The first end of the first housing portion has a cavity or recess which contains at least one electrical terminal pin connector having terminal pins (shown in FIG. 3). The first portion of the housing also includes grooves 4 on the outside surface for seating at least one O-ring or gasket within the grooves and a lip 5 that prevents the sensor-plug from advancing too far inside the condenser drier bottle. The sensor-plug also includes a second housing portion having first and second ends, the first end of the second housing portion adapted to mate to the second end of the first housing portion and the second end of the second housing portion having a socket 6 for attaching to a desiccant assembly. The second portion of the housing further includes a pressure sensing channel for communicating the pressure within the condenser to the pin terminals.

The housing contains a pressure, temperature or combination pressure/temperature sensor 7 within the first and second housing portions. The sensor is used to detect the pressure and/or temperature of the media within the condenser. The pressure sensor is adapted to sense pressure within the condenser tube and is operably connected to the terminal pins of the first housing portion. The sensor 7 can also include a flexible printed circuit 8 (FPC line) to connect the sensor to the pin terminals and connector on the first housing portion. The FPC line and the sensor are enclosed within the first and second portions of the housing. An additional O-ring 9 can be contained between the sensor and the second housing portion in order to form a seal between sensor and the second housing portion. The sensor-plug includes a spiral retaining ring 10, also known as an earless clamp, or a snap ring for securing the sensor-plug to the inside of the drier bottle. The snap ring is contained on the second housing portion 3 to retain the sensor-plug within the drier bottle once the sensor-plug is inserted within the bore of the drier bottle.

The second housing portion can attach to a desiccant via a ball and socket clip 6. The ball end of the desiccant filter assembly snaps into the circular cavity on the second end of the second housing portion. Alternatively, the second housing portion can include two side ears that protrude from the side of the sensor-plug and mate into the desiccant screen to click into place. The housing portions can be composed of plastic, aluminum, brass, metal alloy, pot metal or any other suitable material. The sensor can be a Piezoresistive sensor used to sense the pressure of refrigerant inside the drier bottle. Alternatively, the sensor can be a temperature sensor or a thermistor to sense the refrigerant temperature or a combination of the pressure and temperature sensors. The sensor plug may also include a layer of fluorescent automotive wax dye on an outside surface of the second portion of the housing. The wax dye facilitates in detecting leaks of the sensor-plug and all other connection points within the closed-loop air conditioning system during the assembly process where the wax is activated by fluorescent lighting and can be viewed under use of a black light to detect the presence of dyed refrigerant to identify leaks within the system at all leak-paths or connection points.

Figure 2A:
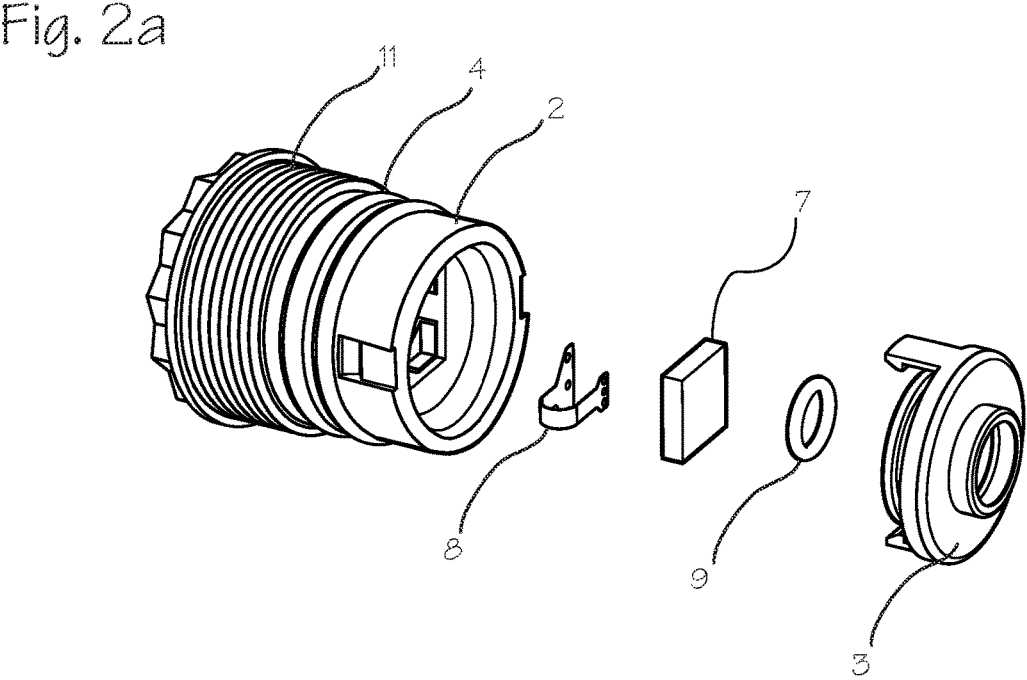
FIGS. 2a and 2b illustrate exploded and assembled views of a threaded sensor-plug.
Figure 2B:
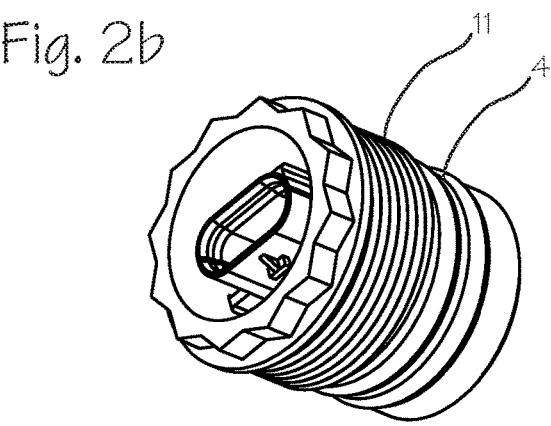

FIGS. 2a and 2b illustrate exploded and assembled views of a threaded sensor-plug. The sensor-plug includes a plug housing having a first portion 2 with first and second ends and a second portion 3 with first and second ends. The first end of the first housing portion has a cavity or recess which contains at least one electrical terminal pin connector having terminal pins (shown in FIG. 4). The first housing portion further includes threads 11 on the outside surface for threaded connection of the sensor-plug within a drier bottle. The threads on the outside surface of the first housing portion thread into the mating threads contained on the inside surface of the drier bottle. The first housing portion also includes a groove 4 for seating at least one O-ring. When the sensor-plug is threaded into position it is tightened to the condenser manufacturer's predetermined torque specification. A seal is formed between the sensor-plug and the drier bottle via at least one O-ring on the sensor-plug. The sensor-plug also includes a second housing portion having first and second ends, the first end of the second housing portion adapted to mate to the second end of the first housing portion and the second end of the second housing portion having a socket for attaching to a desiccant assembly. The second portion of the housing further includes a pressure sensing channel for communicating the pressure within the condenser to the pin terminals. The housing contains a pressure, temperature or combination pressure/temperature sensor within the first and second housing portions. The sensor detects the pressure and/or temperature of the media within the condenser. The sensor 7 includes a flexible printed circuit 8 (FPC line) which connects the sensor to the pin terminals in the first portion of the housing. Both the FPC line and the sensor are enclosed within first and second portions of the housing and are molded therein. The sensor plug may also include a layer of colored automotive wax dye on an outside surface of the housing.

Figure 3:
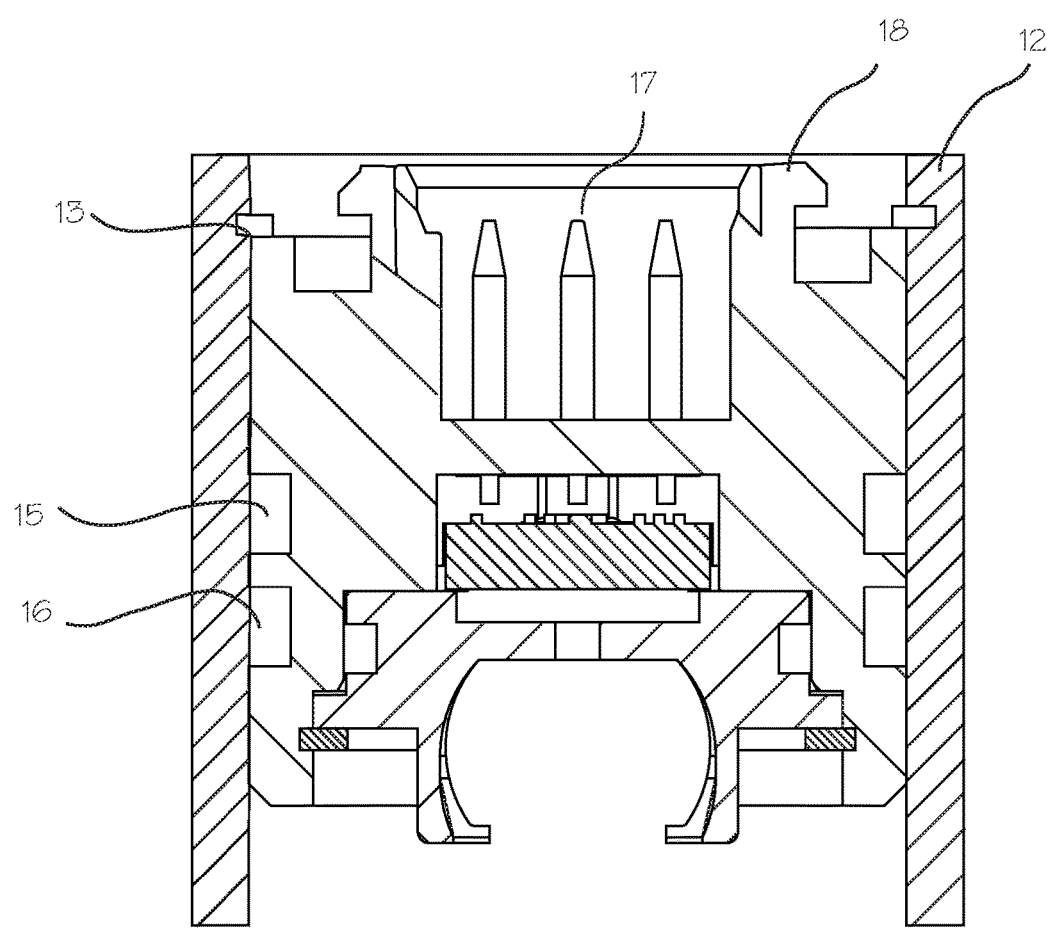
FIG. 3 is a partial cut away view of a sensor-plug of FIGS. 1a and 1b fitted within a drier bottle.

FIG. 3 is a cross sectional view of the sensor plug of FIGS. 1a and 1b fitted within a drier bottle 12. The sensor-plug includes a housing having a first housing portion and a second housing portion that mate closed when all of the elements are positioned within the housing portions. The first housing portion includes grooves 13 on the outside surface for seating at least one O-ring or gasket within at least one groove. The O-ring is located in the middle of the sensor plug between the two snap rings 15 and 16. Snap ring 15 holds the sensor-plug in place by slipping into a machined groove on the side of the drier bottle wall. The second snap ring 16 holds the sensor in place when inserted and fixed into a groove formed into the sidewall of the sensor-plug. The electrical connector of the sensor-plug is a three-pin sensor 17. Alternatively, a thermistor can also be added to the sensor-plug in order to capture the refrigerant temperature. Adding the thermistor requires the electrical connector to be a 4 or 5 pin connector (not shown). The electrical connector can include a positive lock that is either a snap to connect or a twist/snap to lock into place. In addition, the sensor-plug includes an ear(s) 18 to fix a pigtail if required for use with the sensor-plug or assist with removal of the sensor-plug.

Figure 4:
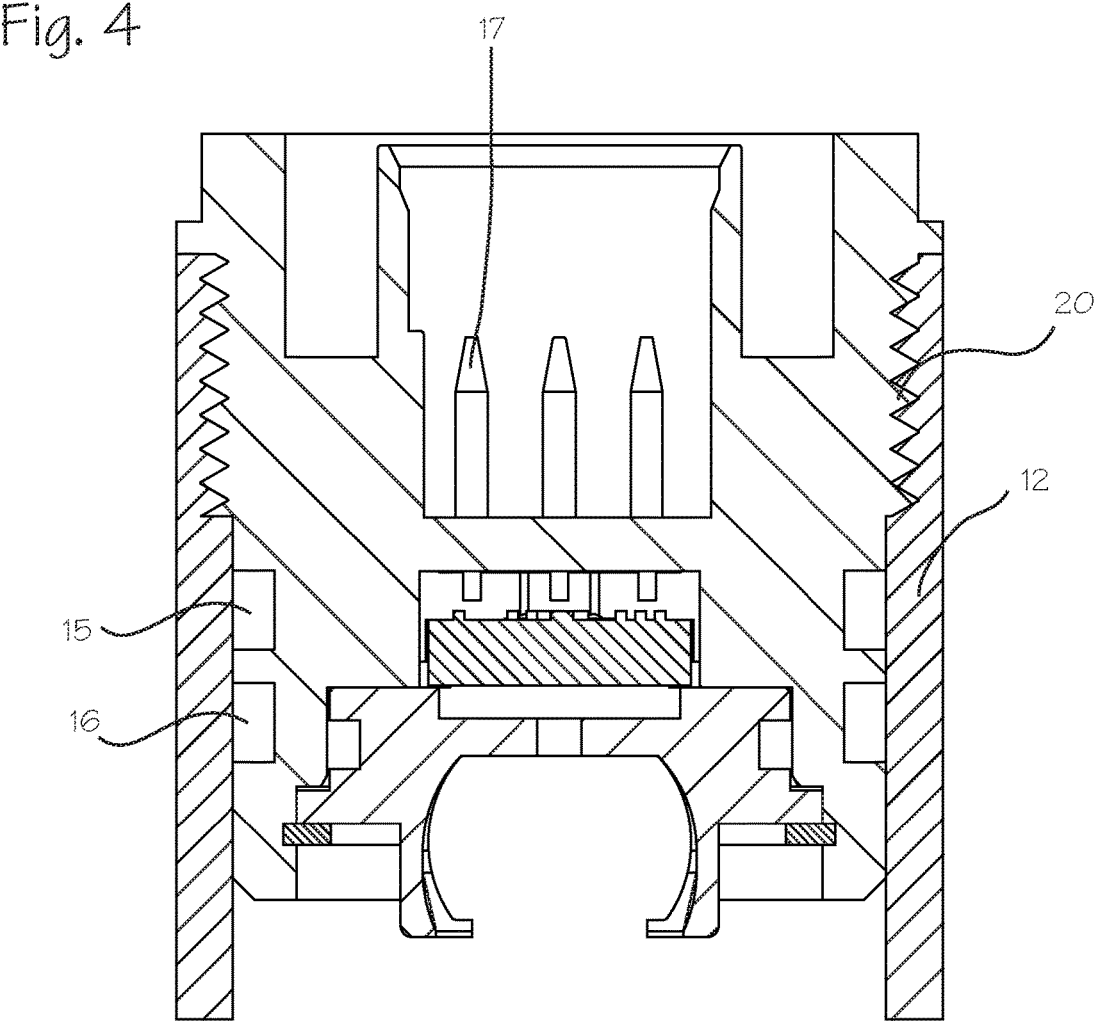
FIG. 4 is a partial cut away view of a threaded sensor-plug of FIGS. 2a 2b fitted within a drier bottle.

FIG. 4 is a partial cut away view of a threaded sensor-plug of FIGS. 2a and 2b fitted within a drier bottle. The sensor-plug includes a housing having a first housing portion and a second housing portion that mate closed when all of the elements are positioned within the housing portions. The outer surface of the first housing portion contains threads 19. The threads mate to threads 20 contained on the inner surface of the drier bottle surface. The sensor-plug is held in position by a threaded connection between the outer surface of the housing and the inner surface of the drier bottle. A seal is formed between the sensor-plug and the drier bottle via at lease one O-ring on the plug. The first housing portion also includes grooves 4 on the outside surface for seating at least one O-ring or gasket within at least one groove. The electrical connector of the sensor-plug is a three-pin terminal in connector 22. Alternatively, a thermistor can also be added to the sensor-plug in order to capture the refrigerant temperature. Adding the thermistor requires the electrical connector to be a 4 or 5 pin connector (not shown). The electrical connector can include a positive lock that is either a snap to connect or a twist/snap to lock into place.

Figure 5:
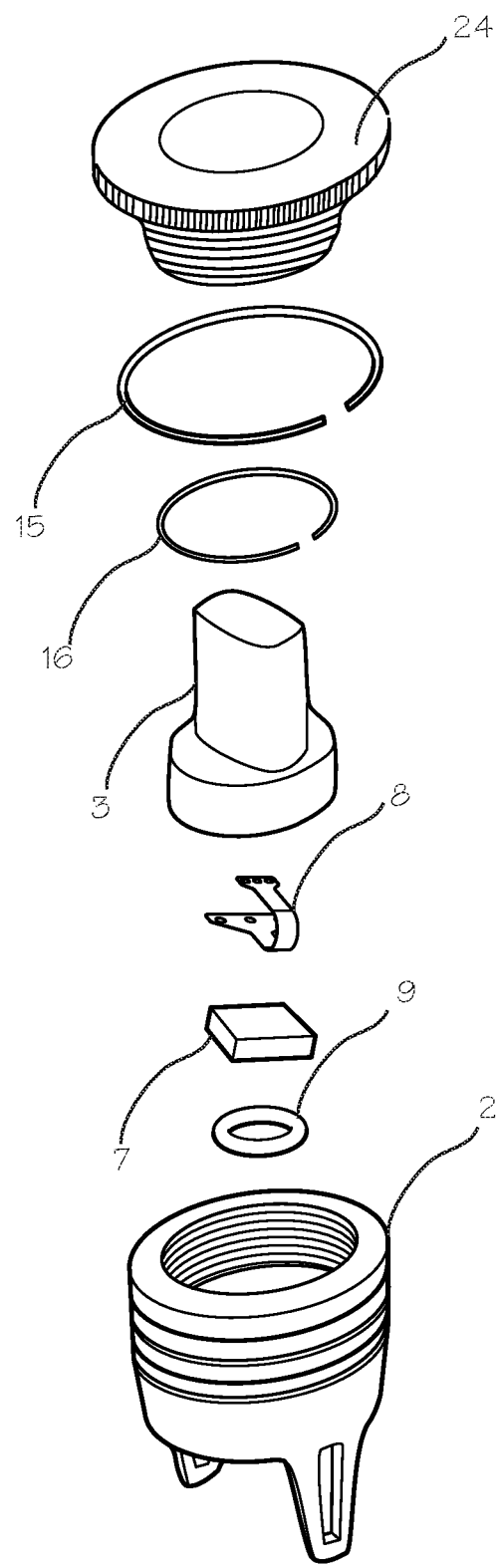
FIG. 5 is an exploded view of an alternative sensor-plug that includes a dust cover.

FIG. 5 is an exploded view of an alternative sensor-plug that includes a dust cover 24. The dust cover prevents dust and debris from entering between the housing and the drier bottle. The first portion and the second portion of the housing contain the flexible printed circuit and sensor described above. A dust cover is fit over the second housing portion and threaded into the first portion of the housing of the sensor plug. When the sensor-plug is inserted into the drier bottle at least one snap ring 15 holds the sensor-plug into place. The dust cover prevents dust and debris from entering the condenser through the sensor-plug around the O-rings.

Figure 6:
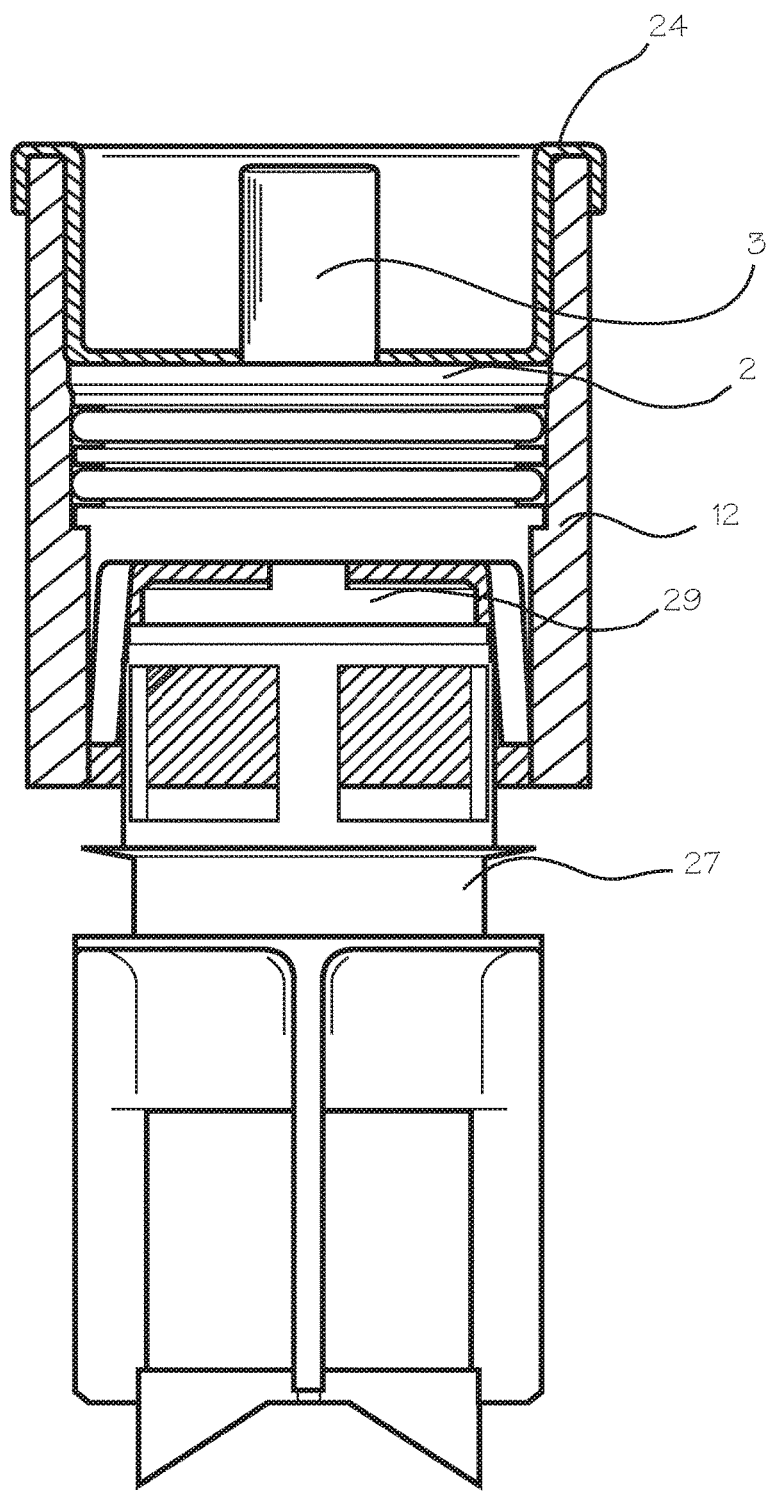
FIG. 6 illustrates the sensor-plug with a dust cover positioned within a drier bottle and attached to a desiccant.

FIG. 6 illustrates the sensor-plug with a dust cover 24 positioned within a drier bottle 12 and attached to a desiccant assembly 27. The dust cover is a rubber boot or cap that fits over the installed sensor-plug and around the drier bottle. In this illustration, the desiccant screen attachment snaps on the first housing portion. The sensor is contained within the sensor-plug 1.

FIG. 7 illustrates the sensor-plug in use within a condenser 28. A desiccant cartridge is first inserted into the condenser drier. The sensor-plug 1 is inserted into the drier bottle 12 behind the cartridge. With a non-threaded sensor-plug, the sensor-plug bottoms out on a machined lip contained on either the sensor-plug or the interior sidewall of the drier bottle (or both). The sensor-plug contains two O-rings on the housing that form a seal. Once the sensor plug is bottomed out, the sensor-plug is then in the correct final position and is secured with a large snap ring that fits into a groove in the sidewall of the drier bottle above the sensor-plug. A threaded sensor-plug is inserted into the drier bottle and the threads on the outside of the sensor-plug housing thread into mating threads on the inside of the drier bottle. The threaded sensor-plug is thus engaged and secured within the drier bottle. When the sensor-plug is mated to the desiccant assembly, a pressure sensing channel is create for communicating the pressure within the condenser through the sensor-plug and to terminal pins on an end of the housing. The sensor-plug then transmits the pressure or temperature electrical signals or readings to a CPU or other connected element. Use of the sensor-plug in the drier bottle means that the stand alone pressure sensor or temperature sensor does not need to be positioned on the condenser opposite of the drier or elsewhere on the condenser or in the air-conditioning system (such as on the receiver drier or hose assembly) as in conventional designs. Thus, there is a reduction in the overall weight and cost of the condenser. In addition, fewer components are required such as the threaded sensor port fitting and machined block port which are eliminated from the design with the current sensor-plug. In addition, sensor-plug reduces the number of leak paths within the condenser and system.

While the preferred embodiments of the devices and methods have been described in reference to the environment in which they were developed, they are merely illustrative of the principles of the inventions. The elements of the various embodiments may be incorporated into each of the other species to obtain the benefits of those elements in combination with such other species, and the various beneficial features may be employed in embodiments alone or in combination with each other. Other embodiments and configurations may be devised without departing from the spirit of the inventions and the scope of the appended claims.

We claim:

1. A condenser plug for sensing pressure within a condenser tube comprising:
    a first housing portion having a first end and a second end, the first housing portion having a cavity on its first end that contains an electrical terminal pin connector having pin terminals, the first housing portion adapted to accommodate a pressure sensor;
    the pressure sensor adapted to sense pressure within the condenser tube, the pressure sensor is operably connected to the terminal pins of the first housing portion; and
    a second housing portion having first and second ends, the first end of the second housing portion adapted to mate to the second end of the first housing portion wherein the first housing portion includes at least one groove on an outer surface of the first housing portion to accommodate a gasket to secure the first housing portion to the condenser tube; and the second end of the second housing portion having a socket to connect with the condenser tube, and when the second end of the condenser plug is connected a pressure sensing channel is created to communicate with the pressure within the condenser to the pressure sensor and the data from the pressure sensor is transmitted to the pin terminals.

2. The condenser plug of claim 1 further including a gasket positioned between the pressure sensor and the second housing portion that forms a seal between a surface of the pressure sensor and the second portion of the housing.

3. The condenser plug of claim 1 wherein the pressure sensor further comprises a temperature sensor for detecting temperature of refrigerant within the condenser tube.

4. The condenser plug of claim 1 wherein the pressure sensor is operably connected to a flexible printed circuit and the terminal pins of the first housing portion.

5. The condenser plug of claim 1 further comprising a retainer ring for securing the condenser plug inside the condenser tube.

6. The condenser plug of claim 1 wherein the electrical pin connector is a three pin terminal.

7. The condenser plug of claim 1 further comprising a layer of wax dye on an outside surface of the second housing portion.

8. The condenser plug of claim 1 wherein the pressure sensor further comprises a temperature sensor for detecting temperature of refrigerant within the condenser tube.

9. A condenser plug for a condenser tube comprising:
    a first housing portion having a first end and a second end, the first housing portion having a cavity on its first end that contains an electrical terminal pin connector having pin terminals, the first housing portion adapted to accommodate a pressure sensor, the first housing portion also having threads on the outside surface for threaded connection of the condenser plug to the condenser tube;
    the pressure sensor adapted to sense pressure within the condenser tube, the pressure sensor is operably connected to the terminal pins of the first housing portion; and
    a second housing portion having first and second ends, the first end of the second housing portion adapted to mate to the second end of the first housing portion wherein the first housing portion includes at least one groove on an outer surface of the first housing portion to accommodate a gasket to secure the first housing portion to the condenser tube; and the second end of the second housing portion having a socket to connect with the condenser tube, and when the second end of the condenser plug is connected a pressure sensing channel is created to communicate with the pressure within the condenser to the pressure sensor and the data from the pressure sensor is transmitted to the pin terminals.

10. The condenser plug of claim 9 further including a gasket positioned between the pressure sensor and the second housing portion that forms a seal between a surface of the pressure sensor and the second portion of the housing.

11. The condenser plug of claim 9 wherein the pressure sensor further comprises a temperature sensor for detecting temperature of refrigerant within the condenser tube.

12. The condenser plug of claim 9 wherein the pressure sensor is operably connected to a flexible printed circuit and the terminal pins of the first housing portion.

13. The condenser plug of claim 9 further comprising a layer of wax dye on an outside surface of the second housing portion.

\* \* \* \* \*